United States Patent Office 3,695,822
Patented Oct. 3, 1972

3,695,822
METHOD OF COLORING A SHAPED BODY OF POLY-γ-ALKYL GLUTAMATE
Akira Akamatsu, Yasuo Takagi, and Makoto Iwatsuki, Kanagawa, Yoko Kida, Tokyo, and Kazuhisa Takeshita, Kanagawa, Japan, assignors to Ajinomoto Co., Inc., Tokyo, Japan
No Drawing. Continuation-in-part of abandoned application Ser. No. 27,421, Apr. 10, 1970. This application Sept. 22, 1970, Ser. No. 74,481
Claims priority, application Japan, Apr. 16, 1969, 44/29,519
Int. Cl. D06p *3/00*
U.S. Cl. 8—4                                           7 Claims

ABSTRACT OF THE DISCLOSURE

When a shaped body of a polymer essentially consisting of repeating units of γ-alkyl glutamate is brought into contact with a solution of a basic, acid, or metal complex dye and of a polyamide in a solvent capable of reversibly swelling the surface layer of the polymer body, the solution is absorbed by the layer. After removal of the solvent, the dye and polyamide are locked in the surface layer. The resulting coloring of the body resists light, water, drycleaning fluids, and abrasion. The method is applicable to fibers and artificial leather based on polyglutamates.

---

This application is a continuation-in-part of the copending application Ser. No. 27,421, filed on Apr. 10, 1970, now abandoned.

This invention relates to the coloring of synthetic organic polymers, and particularly to the coloring of a surface layer on shaped bodies of polymers essentially consisting of repeating units of γ-lower-alkyl glutamate.

Fibers and other shaped bodies of poly-γ-alkyl glutamate have been colored heretofore only by relatively complex methods usually requiring relatively high temperatures which adversely affect the properties of the material.

The primary object of this invention is a method of coloring at least a surface layer of a shaped body of a polymer essentially consisting of repeating units of γ-lower-alkyl glutamate which does not require the use of temperatures significantly higher than ordinary room temperature, and which does not affect the mechanical strength, appearance, consistency, or other properties of the treated polymer.

We have found that at least the surface layers of shaped bodies of polymers essentially consisting of poly-γ-lower-alkyl glutamate can be colored permanently by contacting their surface with a solution of a dye and of a polyamide in an organic solvent capable of slightly and reversibly swelling the surface layer without permanently changing the configuration of the same until the solution penetrates the surface layer, and by thereafter removing the solvent from the layer.

The characteristic properties which make polymer bodies suitable for the coloring treatment of this invention are determined by the poly-γ-alkyl glutamate of which they consist entirely or to at least 60%. The several lower-alkyl glutamates are practically interchangeable for the purpose of this invention, and the method is thus applicable to homopolymers and copolymers of γ-methyl, γ-ethyl, γ-n-propyl, γ-isopropyl, γ-n-butyl, γ-isobutyl glutamate, which may be further combined with minor amounts of repeating units derived from other amino acids such as glycine, analine, leucine, isoleucine, valine, phenylalanine, methionine, or proline. The usual plasticizers, antistatic agents, fireproofing agents, and similar adjuvants when employed in the minor amounts customary in this art do not interfere with the coloring method of the invention.

We have also successfully colored shaped bodies essentially consisting of poly-γ-lower-alkyl glutamate with minor admixtures of other compatible macromolecular compounds including elastomers such as polybutene, natural rubber, polychloroprene, acrylonitrilebutadiene copolymer, polybutadiene, also chlorosulfonated polyethylene, polyvinyl acetate, copolymers of vinyl chloride and vinal acetate, poly-lower-alkyl acrylates and methacrylates, and various urethane prepolymers. Modification of the poly-γ-alkyl glutamate with polyurethane having terminal reactive isocyanate groups does not interfere with the coloring method.

The swelling effects of a wide variety of organic solvents and organic solvent mixtures on poly-γ-alkyl glutamates are known or are readily determined by simple tests. Organic solvents which have the desired slight and reversible swelling effect when used singly include dioxane, tetrahydrofuran, benzene, toluene, xylene, ethylene tetrachloride, 1,1,1-trichloroethane, acetonitrile, dimethylformamide, dimethylacetamide, methyl Cellosolve, ethyl Cellosolve and ethyl acetate, although they depend upon alkyl groups of the poly-γ-alkyl glutamate treated. As is evident from this listing which encompasses cyclic ethers, aromatic hydrocarbons, and aliphatic chlorinated hydrocarbons together with chemically unrelated other solvents, the chemical nature of the solvent is not critical and not a guide to its suitability.

Solvents known to have a strong and destructive swelling effect on poly-γ-alkyl glutamate may be employed in mixtures with non-swelling solvents balanced to have the desired effect. Thus, benzyl alcohol, cresol, methylene chloride, chloroform, 1,2-dichloroethane, 1,1,2-trichloroethane, tetrachloroethane, trichloroethylene, dichloropropane, and carbon tetrachloride may be made suitable for the method of the invention by dilution with inactive solvents such as methanol, ethanol, propanol, butanol or ligroin. The number of basically suitable solvents and solvent combinations is practically unlimited.

Because the solvent has to be removed from the colored surface layer after penetration by the coloring solution, and high drying temperatures are to be avoided, it is preferred to employ solvents having adequate vapor pressure at ambient or slightly elevated temperature, or boiling points of less than 150° C., or water miscible solvents which may be removed by washing the colored object with water.

It is important that the swelling produced by the solvent be reversible so that the original configuration of the shaped body may be restored after processing by removing the solvent. Within this limitation, the amount of swelling produced by the solvent may be varied to suit the specific properties of the polymer treated, the depth of penetration that it is desired to accomplish, and the depth of the color that is to be imparted to the colored layer.

Contact between the polymer and the coloring solution may be established by methods known in themselves, as by brushing the solution on the surface, by spraying the solution, by dipping the body in the solution, and by coating selected portions of its surface by printing techniques, as by gravure printing.

The dyes employed must be soluble in the chosen solvent and have at least some affinity to the dissolved polyamide. Best results have been obtained by the use of acid dyes, metal complex dyes which are normally applied to wool or nylon from weakly acid aqueous dye baths, and basic dyes. Such dyes are staple articles of commerce and are normally identified by their manufacturers by trade names or trademarks regardless of chemical structure and color.

Suitable series of metal complex dyes are identified by the following trade names or trademarks of their manufacturers who names appear in parentheses:

Cibalan (Ciba Co. Inc.)
Isolan (F. Bayer A.G.)
Irgalan (Geigy Co. Inc.)
Lanasyn (Sandoz A.G.)
Opal (Hodogaya Chemical Kogyo Co.)

Suitable series of acid dyes are identified as:

Neolan (Ciba Co. Inc.)
Palatine Fast and Neopalatine (Badische Anilin & Soda)

Acid dyes of the naphthol, quinoline, or pyrazolone type are generally applicable.

Basic dyes useful in the method of the invention are identified by the manufacturers as:

Cathilon (Hodogaya Chemical Kogyo Co.)
Astrazone (F. Bayer A.G.)
Diacryl Supra (Mitsubichi Kasei Kogyo Co., Inc.)

The above listing does not nearly exhaust the range of dyes suitable for the purpose of this invention, as will be evident.

The concentration of dye in the coloring solution is selected to suit the shade to be obtained. It is normally between about 1 and 12 percent by weight. Only light pastel shades can be produced at lower concentrations, and at higher concentrations, the percentage of dye absorbed by the polymer body from the coloring solution drops, making the process less economical.

The selection of suitable polyamides is limited only by the requirement that they be soluble in the chosen solvent. Inexpensive polyamides available in commercial quantities which generally meet the solubility requirement are condensation products of dimerized fat acids with a wide range of polyamines, and known under their trade names or trademarks as Versamid, Versalone, Genamid, Tohmide, Sanmide, and others. Another commercially available soluble polyamide is Toresin (an N-methoxymethyl substituted polycapronamide). Polymers of amino acids also may be employed if they are adequately soluble.

The concentration of the polyamide or polyamides in the coloring solution should not exceed 10% by weight, and is preferably held between 1 and 8 percent. At lower polyamide concentrations, the dye tends to bleed from the surface of the body to be colored. At higher polyamide concentrations, the diffusion of the dye into the polyglutamate is apparently impeded, and the amount of dye adsorbed from the coloring solution is reduced, thereby increasing the cost of producing a desired depth of color.

The optimum weight ratio between polyamide and dye in the coloring solution must be determined by trial and error for each specific set of operating conditions, but will normally be found between 3:1 and 1:2. The actual concentration of the polyamide is chosen within the above limits to obtain the viscosity necessary for the intended mode of application and the equipment to be used.

The polyamide appears to carry the dye into the surface layer of the polyglutamate body, and to retain it in the body after removal of the solvent when the body reverts to its original configuration. The entire process may be performed at room temperature if the solvent is volatile or can be removed by diffusion into water. The colored bodies so obtained have good color fastness not heretofore available in an equally simple and inexpensive manner with shaped bodies of polymers essentially consisting of poly-$\gamma$-lower-alkyl glutamate.

The following examples are further illustrative of this invention:

EXAMPLE 1

A coloring composition was prepared from the following components, all parts being by weight unless stated otherwise:

| | Parts |
|---|---|
| Diacid Fast Yellow 2GP (C.I. 18900) | 5 |
| Toresin | 4 |
| Methanol | 41 |
| 1,2,2-trichloroethane | 50 |

Diacid Fast Yellow 2GP is an acid dye made by Mitsubishi Kasei Kogyo Co. Toresin is N-methoxymethyl-substituted polycapronamide made by Teikoku Chemical Co., Inc. The solid ingredients were readily dissolved in the solvent mixture, and the resulting solution was brushed on a film of poly-$\gamma$-methyl-L-glutamate and permitted to airdry. When the coated film was washed with water, it retained an even, deep, yellow color. The color fastness of the film was excellent as determined by Japanese Industrial Standards (J.I.S.). It satisfied the requirements for lightfastness (J.I.S. K 4004) Class 5; water fastness (J.I.S. K 4006) Class 5; dry rubbing fastness (J.I.S. K 4009, scotching tester) Class 5; rubbing fastness when wet with methanol (same procedure as in dry rubbing test, but 10 reciprocating rubbing strokes) Class 4.

When the trichloroethane was replaced by methanol in the coloring composition, the dye was observed to bleed from the polymer film during application, and such coloring as could be observed after drying was removed during washing with water.

EXAMPLE 2

A coloring composition was prepared by dissolving 5 parts Isolan Olive Green GG (Acid Green 66-monoazo) and 3 parts Versamid 930 in 92 parts dimethylformamide, and was brushed on a film of poly-$\gamma$-methyl-L-glutamate. Isolan Olive Green GG is a metal complex dye made by F. Bayer A. G., and Versamid 930 is a polyamide condensate of dimerized linolic acid with a polyamine and is made by General Mills Inc. The coated film was permitted to dry and was then washed in water. The color fastness of the film, when tested as described in Example 1 was as follows:

| | Class |
|---|---|
| Light fastness | 6 |
| Water fastness | 5 |
| Dry rubbing fastness | 4 |
| Wet rubbing fastness | 4 |

When the Versamid was replaced by 15 parts of Toresin, the amount of dye taken up by the polymer film was reduced so much as to make the product unsatisfactory for practical use.

No significant changes in the product were caused by replacement of the Versamid by an equal quantity of chemically analogous condensation products of dimerized carboxylic acids with polyamines which are commercially available as Versalone, Genamid, Tohmide, Sanmide, and under other trade names and trademarks of many manufacturers.

EXAMPLE 3

3 parts Astrazone Red GTL (C.I. 11085) and 5 parts Tohmide #394 were dissolved in a mixture of 50 parts methylethylketone and 42 parts toluene. Astrazone Red GTL is a basic dye made by F. Bayer A.G. and Tohmide #394 is a polyamide condenstation product of dimerized fat acid with polyamines made by Fujikasei Kogyo Co.

When brushed on a poly-$\gamma$-methyl-L-glutamate film, the solution penetrated the polymer, and the solvent was permitted to evaporate. The dried colored film was washed with water which hardly removed any dye, and was then subjected to tests for color fastness as described in Example 1 with the following results:

| | Class |
|---|---|
| Light fastness | 4 |
| Water fastness | 5 |
| Dry rubbing fastness | 4 |
| Wet rubbing fastness | 4 |

When an otherwise identical coloring solution free from Tohmide was applied in the same manner, much dye was removed during the initial washing with water, and the color fastness of the film was significantly inferior:

| | Class |
|---|---|
| Light fastness | 3 |
| Water fastness | 3 |
| Dry rubbing | 3 |
| Wet rubbing fastness | 2 |

EXAMPLE 4

6 parts Irganol Blue BS and 6 parts poly-L-proline (D.P. 200) were dissolved in a mixture of 65 parts chloroform and 23 parts methanol. Irganol Blue BS is a weakly acid complex dye made by Geigy Co.

The solution was brushed on a film of poly-γ-methyl-L-glutamate and permitted to dry. It was then washed with water which did not remove a significant amount of dye. The colored film was tested for color fastness by the methods described in Example 1 with the following results:

| | Class |
|---|---|
| Light fastness | 5 |
| Water fastness | 5 |
| Dry rubbing fastness | 4 |
| Wet rubbing fastness | 4 |

When the methanol in the coloring solution was replaced by chloroform, the film shrank and its surface lost its smooth texture, making the product economically useless.

The poly-L-proline was replaced successfully in the coloring solution by homopolymers and copolymers of other amino acids and amino acid derivatives characterized by polyamide linkages and solubility in the solvent system employed including polymers of neutral, acidic, and basic amino acids, of ω-monoesters of acidic amino esters, and N-derivatives of basic amino acids, such as homopolymers of glycine, methionine, o-benzyltyrosine, γ-alkyl glutamate, β-alkyl aspartate, ε-carbobenzoxy lysine, σ-carbobenzoxy ornithine, and sarcosine, copolymers of two or more of these amino acids, and mixtures of the homo- and copolymers. "Alkyl" in the afore-mentioned compounds refers to the lower alkyl groups.

EXAMPLE 5

3 parts Cibalan Yellow GRL (Acid Yellow 116) and 6 parts poly-ε-carbobenzoxy-L-lysine (D.P. 70) were dissolved in 35 parts ethyl acetate and 56 parts methylisobutyl ketone. Cibalan Yellow GRL is a metal complex dye made by Ciba Co. Inc.

The solution was sprayed on a film essentially consisting of poly-γ-ethyl-D-glutamate and polybutyl acrylate in a weight ratio of 8:2, and permitted to penetrate the film surface until dry. When the film was thereafter washed with water, no color was removed, and subsequent tests for color fastness had the following results:

| | Class |
|---|---|
| Light fastness | 5 |
| Water fastness | 5 |
| Dry rubbing fastness | 4 |
| Wet rubbing fastness | 4 |

EXAMPLE 6

4 parts Cathilon Brown 3GLH (Basic Brown 11-monoozo) and 4 parts Toresin were dissolved in 65 parts methanol and 27 parts methylethylketone. Cathilon Brown 3GLH is a basic dye made by Hodogaya Chemical Kogyo Co.

The solution was brushed on a film of a copolymer essentially consisting of repeating units of γ-methyl-D-glutamate and γ-n-butyl-D-glutamate in a numerical ratio of 3:1. After drying of the applied solution and washing, the film was subjected to tests for color fastness as described above.

| | Class |
|---|---|
| Light fastness | 6 |
| Water fastness | 5 |
| Dry rubbing fastness | 4 |
| Wet rubbing fastness | 4 |

Analogous results were obtained with the use of butanol as a solvent which was removed from the colored surface layer by washing with water.

EXAMPLE 7

7 parts Irgalan Red 2BL (Acid Red 219) and 1 part Toresin were dissolved in a mixture of 75 parts methanol and 17 parts benzyl alcohol. Irgalan Red 2BL is a weakly acid complex dye made by Geigy Co.

The solution was brushed on a film composed of 70 parts poly-γ-methyl-L-glutamate and 30 parts condensation product of a poly ethylene adipate and hexamethylene diisocyanate, having terminal isocyanate groups and a molecular weight of approximately 1,000.

The solvent was permitted to evaporate, and the film was then washed with water which hardly removed any dye. The colored film was tested for color fastness by the methods described in Example 1 with the following results:

| | Class |
|---|---|
| Light fastness | 5 |
| Water fastness | 5 |
| Dry rubbing fastness | 5 |
| Wet rubbing fastness | 3 |

Additional tests of the several colored polymer films prepared according to this invention showed that their drycleaning resistance was excellent. The thickness of the colored surface layer was sufficient to avoid loss of color depth upon severe deformation of the films as by bending, stretching, or even scratching. The mechanical properties of the films, their appearance and handling characteristics were not affected by the coloring treatment.

Polymer films essentially consisting of repeating units of γ-lower-alkyl glutamates were chosen in the preceding examples because of the convenience with which reproducible results can be obtained in color fastness tests on uniform, flat surfaces. However, the specific shape of the polymer body is not relevant to the success of the invention which only affects the color of a surface layer varying somewhat in thickness with specific operating conditions. Fibers of various thicknesses and sheets too heavy to be encompassed by the term "films" have been colored by brushing, spraying, dipping, or otherwise contacting the polymeric material with the coloring solutions of the invention until the solutions penetrated the surface layers of the shaped bodies, and by thereafter removing the solvent, leaving the dye and the polyamide initially present in the solution firmly locked in the polymer body.

The coloring method of the invention has been applied with particular advantage to poly-γ-glutamate sheets intended as leather substitutes. The color of the surface layer resists all environmental influences to which shoe uppers are normally exposed, and the coloring process does not change the desirable surface configuration, touch, and handling characteristics of the polymer which make it similar to natural leather.

While the invention has been described with particular reference to specific embodiments, it is to be understood that it is not limited thereto, but is to be construed broadly and restricted solely by the scope of the appended claims.

What is claimed is:

1. A method of coloring a shaped body of a polymer essentially consisting of repeating units of γ-lower-alkyl glutamate which comprises:
   (a) contacting a surface layer of said body with a solution of a dye and of a polyamide in an organic solvent capable of reversibly swelling said layer without permanently changing the configuration of the same until said solution penetrates said layer; and
   (b) removing said solvent from said layer,
      (1) the amount of said polyamide in said solution being effective for reducing the amount of dye removed from said body when said body is washed with water after the removing of said solvent,
      (2) said dye having affinity for said polyamide and being an acid dye, a metal complex dye, or a basic dye.

2. A method as set forth in claim 1, wherein said solvent has a boiling point of less than 150° C. and is removed from said layer by evaporation.

3. A method as set forth in claim 1, wherein said solvent is miscible with water and is removed from said layer by washing said layer with water.

4. A method as set forth in claim 1, wherein said dye is an acid dye or a basic dye.

5. A method as set forth in claim 4, wherein the amount of said dye in said solution is 1 to 12 percent by weight.

6. A method as set forth in claim 5, wherein the weight ratio of said polyamide to said dye is between 3:1 and 1:2.

7. A method as set forth in claim 6, wherein the amount of said polyamide in said solution is 1 to 10 percent by weight.

References Cited

FOREIGN PATENTS 724,041   2/1955   Great Britain _____ 424—61

OTHER REFERENCES

Exparte Schoonover et al., decision of the Board of Appeals Patent No. 2,743,991, paper No. 23, 6 pages.

Exparte Schoeneberg et al. decision of the Board of Appeals Patent No. 3,190,718, Paper No. 27, 4 pages.

GEORGE F. LESMES, Primary Examiner

T. J. HERBERT, JR., Assistant Examiner

U.S. Cl. X.R.

8—162 A